United States Patent
Kato

(10) Patent No.: US 9,494,119 B2
(45) Date of Patent: Nov. 15, 2016

(54) FUEL INJECTOR

(71) Applicant: DENSO CORPORATION, Kariya, Aichi-pref. (JP)

(72) Inventor: Noritsugu Kato, Chiryu (JP)

(73) Assignee: DENSO CORPORATION, Kariya (JP)

( * ) Notice: Subject to any disclaimer, the term of this patent is extended or adjusted under 35 U.S.C. 154(b) by 161 days.

(21) Appl. No.: 14/561,915

(22) Filed: Dec. 5, 2014

(65) Prior Publication Data

US 2015/0159612 A1 Jun. 11, 2015

(30) Foreign Application Priority Data

Dec. 11, 2013 (JP) .................................. 2013-256235

(51) Int. Cl.
  *F02M 61/18* (2006.01)
  *F02B 23/10* (2006.01)
  *F02B 17/00* (2006.01)

(52) U.S. Cl.
  CPC ........ *F02M 61/1826* (2013.01); *F02B 23/101* (2013.01); *F02B 23/104* (2013.01); *F02M 61/1833* (2013.01); *F02M 61/1846* (2013.01); *F02B 2023/103* (2013.01); *Y02T 10/125* (2013.01)

(58) Field of Classification Search
  CPC ............. F02M 61/18; F02M 61/1826; F02M 61/1833; F02M 61/1846; F02B 23/104; F02B 17/00; F02B 23/101; Y02T 10/125
  See application file for complete search history.

(56) References Cited

U.S. PATENT DOCUMENTS 6,854,448 B2 * 2/2005 Okamoto ........... F02M 51/0678
  123/298

FOREIGN PATENT DOCUMENTS

| JP | 11-082247 | 3/1999 |
|----|-----------|--------|
| JP | 2005-061271 | 3/2005 |
| JP | 2005-194929 | 7/2005 |

(Continued)

OTHER PUBLICATIONS

Office Action (2 pages) dated Oct. 27, 2015, issued in corresponding Japanese Application No. 2013-256235 and English translation (3 pages).

*Primary Examiner* — Hieu T Vo
(74) *Attorney, Agent, or Firm* — Nixon & Vanderhye P.C.

(57) ABSTRACT

A fuel injector injecting a fuel toward a combustion chamber mounted to a gasoline engine is provided with plural injection ports through which the fuel is injected. Each injection port includes an injection-port axial line limiting a pointing direction of the injection port, and the injection-port axial lines point to different directions. The injection ports include at least one intake injection port the injection-port axial line of which points to an intake space in the combustion chamber between a top surface of a piston of the internal combustion engine and an intake valve of the internal combustion engine. The intake injection port is defined by an inner peripheral wall surface extending in the injection-port axial line of the intake injection port and having a straight shape. The injection ports further include at least one exhaust injection port the injection-port axial line of which points to an exhaust space in the combustion chamber between the top surface of the piston of the internal combustion engine and an exhaust valve of the internal combustion engine. The exhaust injection port is defined by an inner peripheral wall surface separated from the injection-port axial line of the exhaust injection port toward an outlet opening and having an enlarged shape toward the outlet opening.

7 Claims, 12 Drawing Sheets

(56) References Cited

FOREIGN PATENT DOCUMENTS

| JP | 2005-337191 | | | 12/2005 | |
| JP | 2006188995 | A | * | 7/2006 | ............ F02M 69/00 |
| JP | 2007-085333 | | | 4/2007 | |
| JP | 4069750 | | | 1/2008 | |
| JP | 2009-062925 | | | 3/2009 | |
| JP | 2009-114925 | | | 5/2009 | |
| JP | 2010-151053 | | | 7/2010 | |

* cited by examiner

FUEL INJECTOR

CROSS REFERENCE TO RELATED APPLICATION

This application is based on Japanese Patent Application No. 2013-256235 filed on Dec. 11, 2013, the disclosure of which is incorporated herein by reference.

TECHNICAL FIELD

The present disclosure relates to a fuel injector which injects a fuel into a combustion chamber mounted to an internal combustion engine.

BACKGROUND

A fuel injector is provided with plural injection ports injecting a fuel toward a combustion chamber. According to Japanese Patent No. 4069750, in the above fuel injector, an inner diameter of an injection port (intake injection port) pointing to an intake area of the combustion chamber is less than an inner diameter of an injection port (exhaust injection port) pointing to an exhaust area of the combustion chamber. Therefore, a mixed gas of the fuel and air in the combustion chamber is homogenized.

However, in the fuel injector according to Japanese Patent No. 4069750, since the inner diameter of the intake injection port is less than the inner diameter of the exhaust injection port, a penetration of a spray of the fuel injected from the intake injection port is less than a penetration of a spray of the fuel injected from the exhaust injection port. Then, in an internal combustion engine, it is difficult that the fuel enters and is completely mixed with the whole air flowing at a high flow rate in the intake area of the combustion chamber. In contrast, since the spray of the fuel injected from the exhaust injection port having the inner diameter greater than that of the intake injection port has a high penetration, the fuel may go through the air having a low flow rate in the exhaust area of the combustion chamber. As a result, it is difficult that the fuel is mixed with the air.

Further, in the fuel injector, the penetration of the spray of the fuel is adjusted by changing the inner diameter of the intake injection port or the exhaust injection port. A quantity of the fuel flowing through the intake injection port is less than a quantity of the fuel flowing through the exhaust injection port. Therefore, even though the quantity of the fuel is corrected by an arrangement or the number of the intake injection port and the exhaust injection port, it is difficult that each injection port supplies an optimal quantity of the fuel in different pointing directions.

SUMMARY

The present disclosure is made in view of the above matters, and it is an object of the present disclosure to provide a fuel injector which injects a quantity of a fuel into every position of a combustion chamber in a state that the fuel is readily mixed with air, and a homogeneity of a mixed gas of the fuel and the air in the combustion chamber can be improved.

According to an aspect of the present disclosure, a fuel injector injecting a fuel toward a combustion chamber mounted to a gasoline engine is provided with plural injection ports through which the fuel is injected. Each injection port includes an injection-port axial line limiting a pointing direction of the injection port, and the injection-port axial lines point to different directions. The injection ports include at least one intake injection port the injection-port axial line of which points to an intake space in the combustion chamber between a top surface of a piston of the internal combustion engine and an intake valve of the internal combustion engine. The intake injection port is defined by an inner peripheral wall surface extending in the injection-port axial line of the intake injection port and having a straight shape. The injection ports further include at least one exhaust injection port the injection-port axial line of which points to an exhaust space in the combustion chamber between the top surface of the piston of the internal combustion engine and an exhaust valve of the internal combustion engine. The exhaust injection port is defined by an inner peripheral wall surface separated from the injection-port axial line of the exhaust injection port toward an outlet opening and having an enlarged shape toward the outlet opening.

Since the intake injection port has the straight shape, a spray of the fuel injected from the intake injection port has a high penetration. Since the penetration of the spray of the fuel injected from the intake injection port is increased, the fuel can enter and be readily mixed with the whole air flowing at a high flow rate in the intake space of the combustion chamber.

Since the exhaust injection port has the enlarged shape toward the outlet opening, the penetration of the spray of the fuel injected from the exhaust injection port becomes less than the penetration of the spray of the fuel injected from the intake injection port. Therefore, the spray of the fuel injected from the exhaust injection port is completely mixed with the whole air without going through the air in the exhaust space of the combustion chamber that flows at a flowing rate less than the air in the intake space of the combustion chamber.

Further, the penetration of the spray of the fuel is adjusted by forming different shapes of the intake injection port and the exhaust injection port. Therefore, the quantity of the fuel flowing through the intake injection port or the exhaust injection port is properly adjusted in a design stage. The plural injection ports can supply optimal quantity of the fuel in different pointing direction.

Since the fuel injector can supply a proper quantity of the fuel to be mixed with the air at every position of the combustion chamber, a homogeneity of a mixed gas of the fuel and the air in the combustion chamber can be improved.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
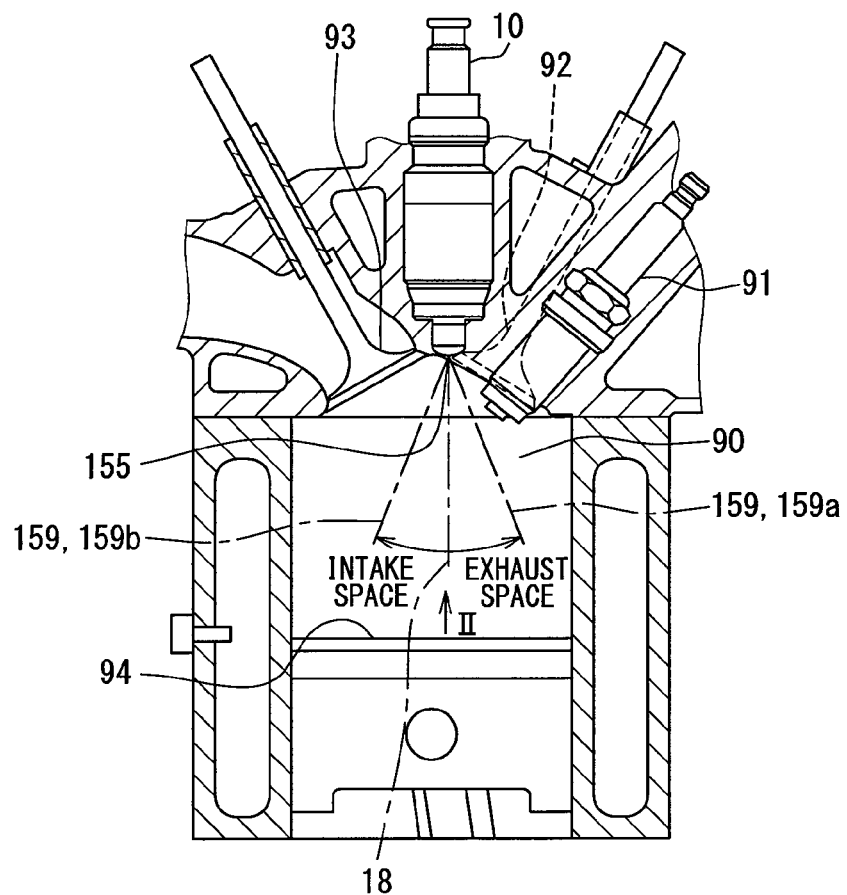
FIG. 1 is a diagram showing a fuel injector mounted to a gasoline engine to execute a center injection, according to a first embodiment of the present disclosure.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

Hereafter, referring to drawings, embodiments of the present disclosure will be described. The substantially same parts or components as those in the embodiments are indicated with the same reference numerals and the same descriptions may be omitted. When only a part of a configuration in each embodiment is described, the other parts of the configuration can be configured as the same as a prior embodiment. Further, it is to be understood that the disclosure is not limited to the embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure. Even though combinations of components described in embodiments and modification examples are not clearly indicated, the combinations are considered to be disclosed in the following description.

First Embodiment

Figure 2:
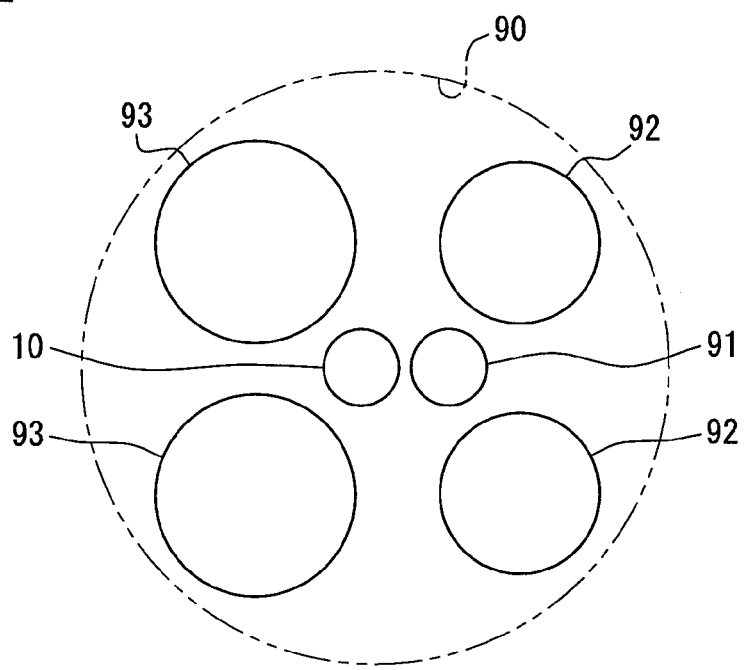
FIG. 2 is a block diagram viewed from an arrow II of FIG. 1 and showing a relationship between the fuel injector and other members around the fuel injector according to the first embodiment.

Referring to FIGS. 1 and 2, a fuel injector 10 according to a first embodiment of the present disclosure is mounted to a gasoline engine corresponding to an internal combustion engine. The fuel injector 10 injects fuel from plural injection ports 155 into a combustion chamber 90 provided in the gasoline engine. The combustion chamber 90 is divided by a cylinder block, a cylinder head, and a piston 94. The cylinder head is provided with the fuel injector 10, two intake valves 93, two exhaust valves 92, and an ignition plug 91. The fuel injector 10 and the ignition plug 91 are arranged to be adjacent to each other and are surrounded by the intake valves 93 and the exhaust valves 92. In other words, the fuel injector 10 and the ignition plug 91 are arranged at a center position of the intake valves 93 and the exhaust valves 92. The fuel injector 10 is placed at a position closer to the intake valves 93 than the ignition plug 91 is, and includes an end part exposed to the combustion chamber 90. The end part of the fuel injector 10 forms the injection ports 155. The ignition plug 91 is placed at a position closer to the exhaust valves 92 than the fuel injector 10 is, and includes an end part exposed to the combustion chamber 90. A flame kernel is generated in the end part of the ignition plug 91. In addition, FIG. 1 indicates the intake valves 93 and the exhaust valves 92 in a valve-opening state.

Figure 3:
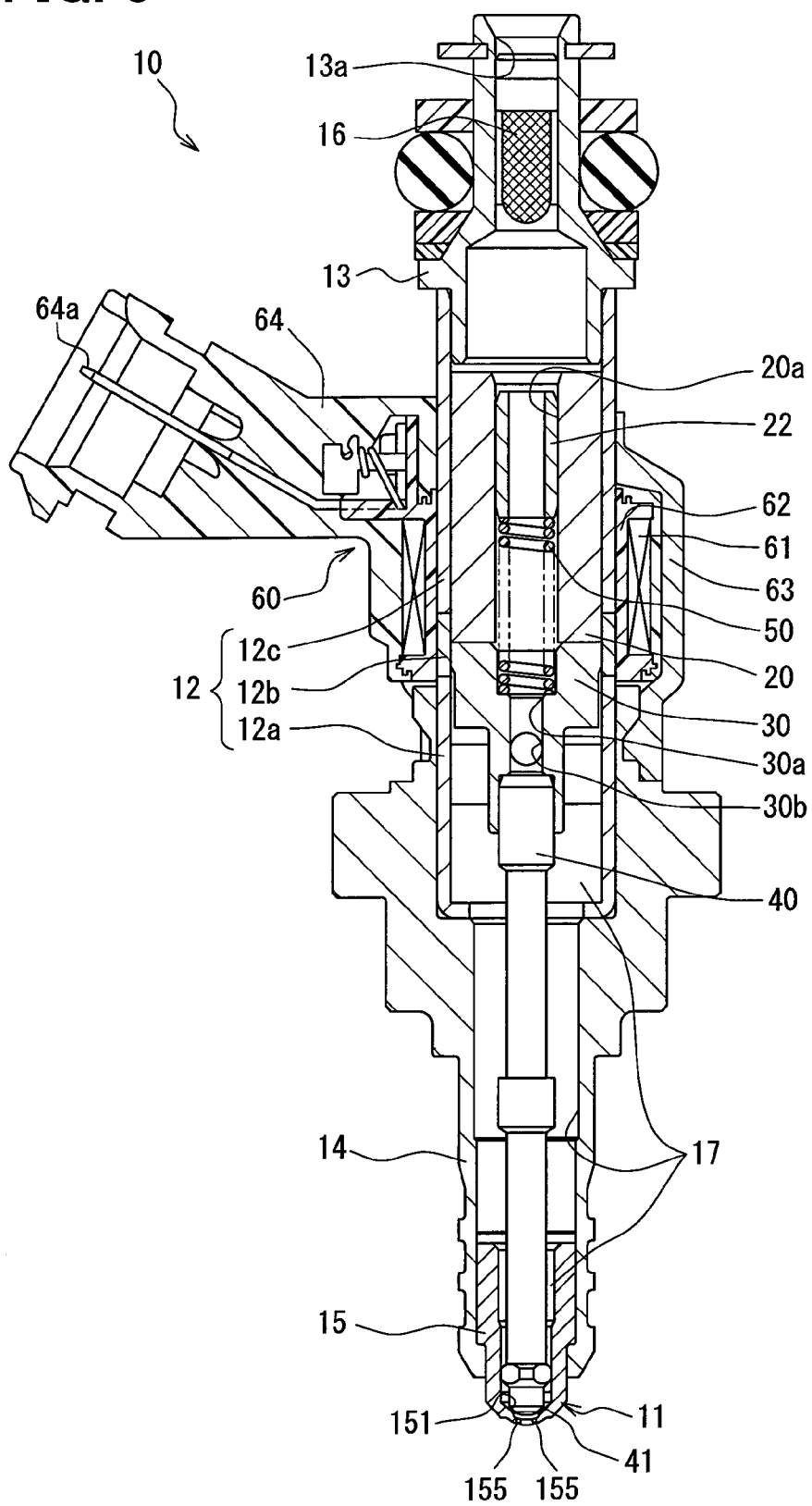
FIG. 3 is a sectional view showing the fuel injector.

As shown in FIG. 3, the fuel injector 10 includes a valve body 11, a stator core 20, a movable core 30, a valve member 40, an elastic member 50, and a driving portion 60.

The valve body 11 includes a core housing 12, an inlet member 13, a nozzle holder 14, and a nozzle body 15. The core housing 12 is a cylindrical shape, and includes a first magnetic portion 12a, a non-magnetic portion 12b, and a second magnetic portion 12c in this order in an axial direction of the core housing 12 from a first end portion of the core housing 12 toward a second end portion of the core housing 12. The first magnetic portion 12a and the second magnetic portion 12c are made of magnetic material, and the non-magnetic portion 12b is made of non-magnetic material. The first magnetic portion 12a, the non-magnetic portion 12b, and the second magnetic portion 12c are bonded by laser welding. The non-magnetic portion 12b is interposed between the first magnetic portion 12a and the second magnetic portion 12c to prevent a short cut of a magnetic flux.

The inlet member 13 which is a cylindrical shape is fixed to an end portion of the second magnetic portion 12c opposite to the non-magnetic portion 12b in the axial direction. The inlet member 13 forms a fuel inlet 13a through which a fuel is supplied from a fuel pump (not shown). According to the first embodiment, a filter 16 is fixed to an inner periphery of the inlet member 13. Therefore, the fuel supplied to the fuel inlet 13a is filtrated and is introduced into the core housing 12 placed at a position downstream of the fuel inlet 13a.

Figure 4:
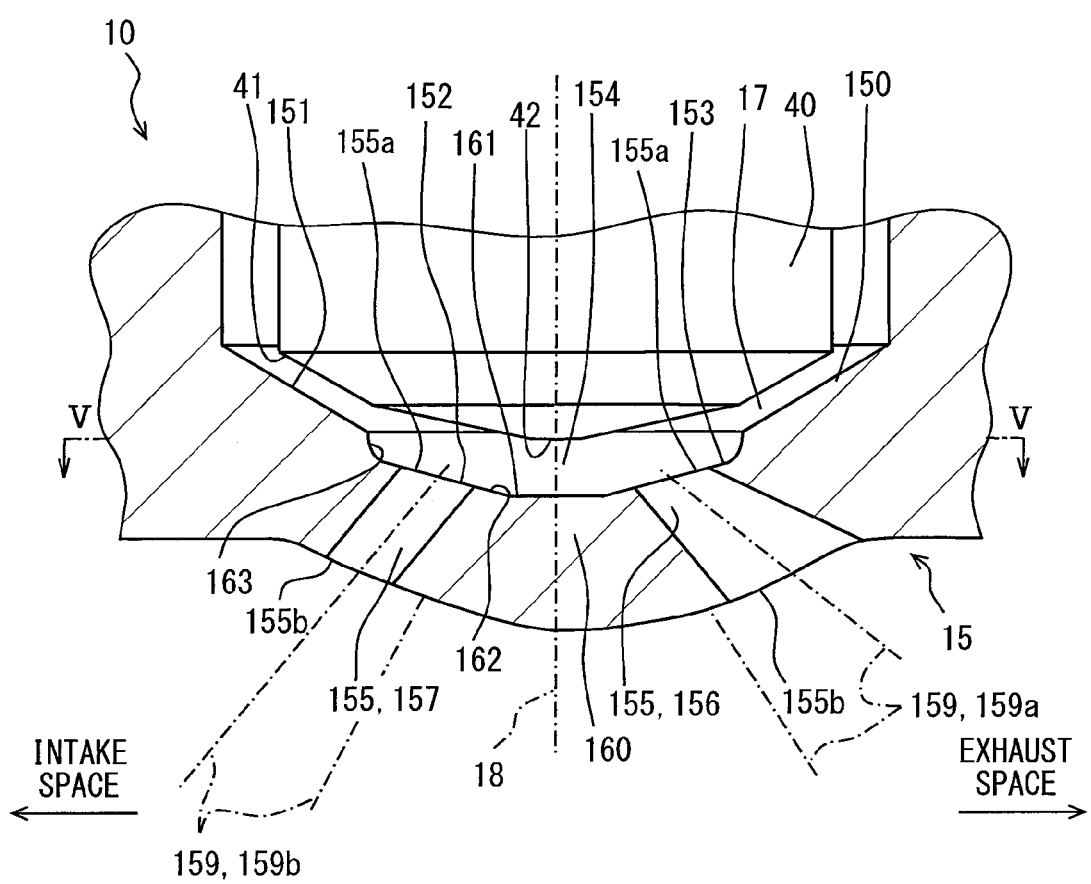
FIG. 4 is a sectional view showing a sack portion.

The nozzle body 15 is fixed to an end portion of the first magnetic portion 12a opposite to the non-magnetic portion 12b in the axial direction via the nozzle holder 14. The nozzle holder 14 is made of magnetic material and is a cylindrical shape. The nozzle body 15 is a bottomed cylindrical shape. The core housing 12, the nozzle holder 14, and the nozzle body 15 forms a fuel passage 17. As shown in FIG. 4, the nozzle body 15 includes a valve seat portion 150 and a sack portion 152.

Figure 5:
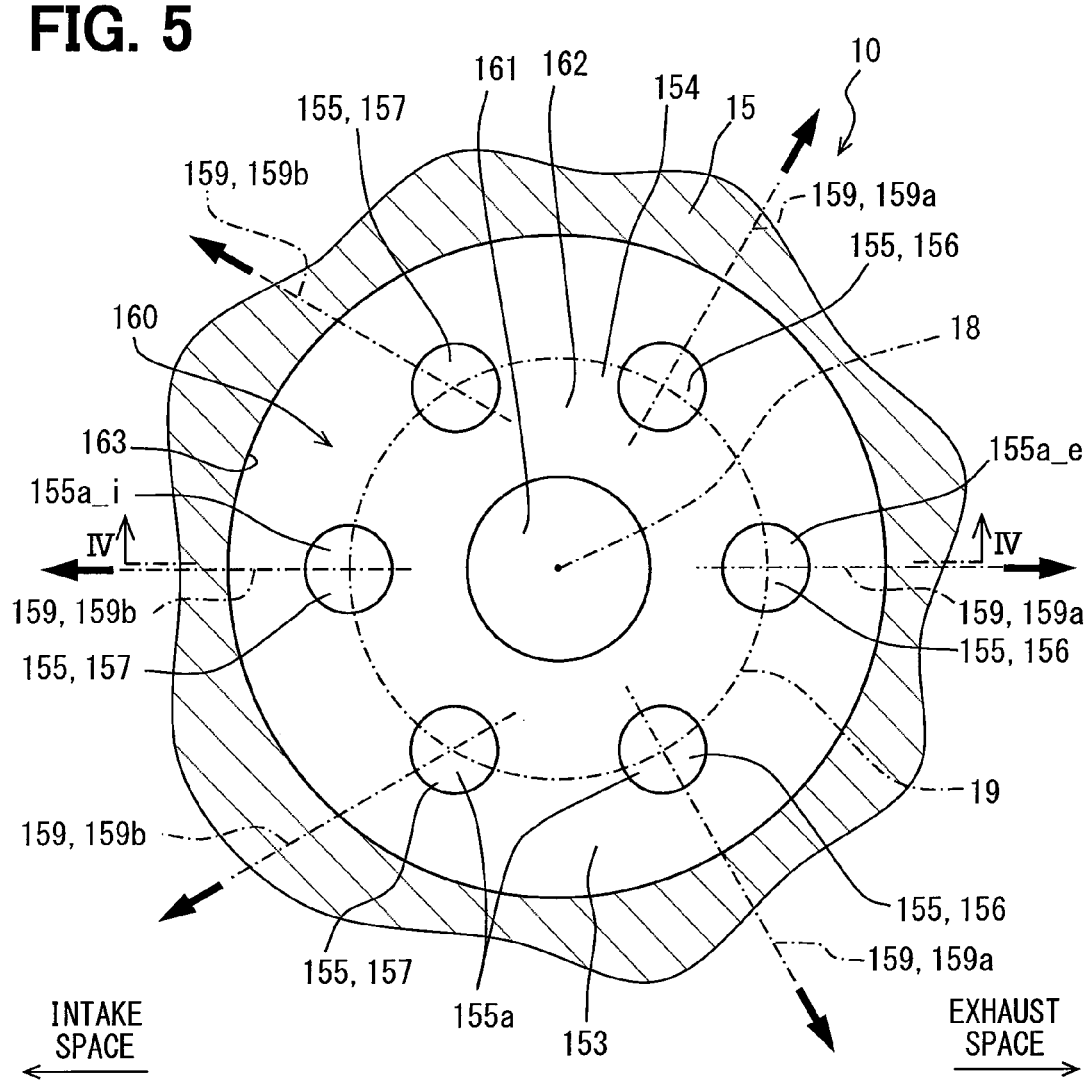
FIG. 5 is a sectional view of FIG. 4 along a line V-V.

The valve seat portion 150 forms a valve seat surface 151 by an inner peripheral surface of the valve seat portion 150. The inner peripheral surface is a tapered shape, and a diameter of the valve seat portion 150 is reduced in an axial direction of the valve seat portion 150 toward a downstream portion of the valve seat portion 150. The sack portion 152 is placed at a position adjacent to the downstream portion of the valve seat portion 150 forming the fuel passage 17 by using the valve seat surface 151. The sack portion 152 is provided with a recession portion 153 that is a cylindrical-shaped hole opened at the sack portion 152 toward the fuel passage 17. The recession portion 153 forms a sack chamber 154. The injection ports 155 communicating with the sack chamber 154 are opened at an inner surface of the recession portion 153. As shown in FIGS. 4 and 5, the injection ports 155 are arranged around a center axial line 18 of the recession portion 153 and are spaced from each other. Inlet openings 155a of the injection ports 155 are arranged along an imaginary circle 19. According to the present embodiment, a center of the imaginary circle 19 is on the center axial line 18, and a center of each of the inlet openings 155a is on the imaginary circle 19. Each of the injection ports 155 is tilted outward of the recession portion 153, and has an outlet opening 155b.

As shown in FIG. 3, the stator core 20 is made of magnetic material and is a cylindrical shape. The stator core 20 is coaxially fixed to an inner peripheral surface of the non-magnetic portion 12b and an inner peripheral surface of the second magnetic portion 12c. In other words, an axle of the stator core 20 corresponding to an axle of the non-magnetic portion 12b and an axle of the second magnetic portion 12c. The stator core 20 forms a through hole 20a penetrating the stator core 20 in an axial direction of the stator core 20 along an axle of the stator core 20. The fuel flowing from the fuel inlet 13a to the through hole 20a via the filter 16 flows through the through hole 20a toward the movable core 30.

The movable core 30 is made of magnetic material and is a stepped cylindrical shape. The movable core 30 is coaxially arranged on an inner periphery of the core housing 12 and is opposite to the stator core 20. The movable core 30 is guided by the inner peripheral surface of the non-magnetic portion 12b, and is movable in an axial direction of the movable core 30. The movable core 30 includes a first through hole 30a penetrating the movable core 30 in the axial direction of the movable core 30 along an axle of the movable core 30, and a second through hole 30b penetrating the movable core 30 in a radial direction of the movable core 30 to cross the first through hole 30a. The first through hole 30a and the second through hole 30b communicate with each other. The fuel flows from the through hole 20a, flows into the first through hole 30a, and flows into the fuel passage 17 via the second through hole 30b.

The valve member 40 is made of non-magnetic material and has a cross section that is a circular needle shape. The valve member 40 is disposed in the fuel passage 17, and is coaxial with the core housing 12, the nozzle holder 14, and the nozzle body 15. A first end portion of the valve member 40 is coaxially fixed to an inner peripheral surface of the first through hole 30a. As shown in FIGS. 3 and 4, a second end portion of the valve member 40 is provided with a contact portion 41. A diameter of the contact portion 41 is reduced in an axial direction of the contact portion 41 toward a downstream portion of the contact portion 41. The contact portion 41 is capable of abutting on the valve seat surface 151. The valve member 40 makes the contact portion 41 be seated on or removed from the valve seat surface 151 by a displacement of the valve member 40 along the center axial line 18. A fuel injection of the injection ports 155 is prohibited or allowed. Specifically, in a valve-opening state, the valve member 40 makes the contact portion 41 be removed from the valve seat surface 151, and the fuel flows from the fuel passage 17 to the sack chamber 154 and is injected to the combustion chamber 90 from the injection ports 155. In a valve-closing state, the valve member 40 makes the contact portion 41 be seated on the valve seat surface 151, the fuel injection that the fuel is injected to the combustion chamber 90 from the injection ports 155 is blocked.

As shown in FIG. 3, the elastic member 50 corresponds to a compression coil spring that is made of metal, and is coaxially received in an inner periphery of the through hole 20a. A first end portion of the elastic member 50 is locked by an end portion of an adjusting pipe 22 fixed to the inner periphery of the through hole 20a. A second end portion of the elastic member 50 is locked by an inner surface of the first through hole 30a of the movable core 30. The elastic member 50 is interposed between the adjusting pipe 22 and the movable core 30 and is compressed by the adjusting pipe 22 and the movable core 30 to be elastically deformed. Therefore, a recovery force generated by an elastic deformation of the elastic member 50 corresponds to a biasing force that biases the movable core 30 and the valve member 40 toward the injection ports 155.

The driving portion 60 includes a coil 61, a bobbin 62, a yoke 63, and a connector 64. The coil 61 is formed by winding a metal wire around the bobbin 62 that is made of resin. The yoke 63 having magnetism is arranged around the coil 61. The coil 61 is coaxially fixed to outer peripheral surfaces of the non-magnetic portion 12b and the second magnetic portion 12c via the bobbin 62. In other words, the coil 61 is arranged around the stator core 20. The coil 61 is electrically connected with an external control circuit (not shown) via a rod 64a disposed in the connector 64. The coil 61 is controlled by the external control circuit.

When the coil 61 is energized to excite, a magnetic flux flows through a magnetic circuit generated by the yoke 63, the nozzle holder 14, the first magnetic portion 12a, the movable core 30, the stator core 20, and the second magnetic portion 12c. In this case, a magnetic attractive force which attracts the movable core 30 toward the stator core 20 is generated between the movable core 30 and the stator core 20. When the coil 61 is deenergized to degauss, the magnetic flux does not flow through the magnetic circuit, and the magnetic attractive force disappears.

In a valve-opening operation of the fuel injector 10, since the coil 61 starts to be energized, the magnetic attractive force is applied to the movable core 30. In this case, since the valve member 40 and the movable core 30 is moved toward the stator core 20 by canceling the recovery force of the elastic member 50, the valve member 40 and the movable core 30 are stopped after the movable core 30 abutting on the stator core 20. Thus, the contact portion 41 is removed from the valve seat surface 151, and the fuel is injected from each of the injection ports 155.

In a valve-closing operation of the fuel injector 10 after the valve-opening operation, since the coil 61 is deenergized, the magnetic attractive force applied to the movable core 30 disappears. In this case, the valve member 40 and the movable core 30 are moved toward the valve seat surface 151 according to the recovery force of the elastic member 50, and the valve member 40 and the movable core 30 are stopped after the valve member 40 abuts on the valve seat surface 151. Thus, the contact portion 41 is seated on the valve seat surface 151, and the fuel injection is stopped.

Next, referring to FIGS. 4 and 5, a configuration of the recession portion 153 will be described. A bottom wall 160 of the recession portion 153 is spaced from the valve member 40. When the contact portion 41 abuts on the valve seat surface 151, the sack chamber 154 communicating with the injection ports 155 is formed between an end surface 42 of the valve member 40 and the bottom wall 160. The sack chamber 154 has a capacity limited to reduce a jamming of foreign matters included in the fuel. According to the present embodiment, foreign matters may be contaminants.

A bottom surface of the bottom wall 160 is provided with a center surface 161 and a tapered surface 162. The bottom wall 160 further includes a connection surface 163 placed at a position radially outward of the bottom surface. The center surface 161 is a flat surface that is a circular shape, and a center of the center surface 161 is placed on the center axial line 18. A diameter of the tapered surface 162 is reduced in the axial direction toward the center surface 161. The connection surface 163 is recessed curved surface, and a diameter of the connection surface 163 is reduced in the axial direction toward a downstream portion of the bottom wall 160. The connection surface 163 is connected to an outer periphery of the tapered surface 162 and an inner periphery of the valve seat surface 151.

According to the present embodiment, the bottom wall 160 is provided with six injection ports 155. Each of the injection ports 155 extends in a direction along a corresponding injection-port axial line 159 of each of the injection ports 155. The injection-port axial lines 159 indicate center axial lines of the injection ports 155. The injection-port axial lines 159 limit pointing directions of the injection ports 155, that is, the injection-port axial lines 159 limit injection directions of the injection ports 155 as arrows shown in FIG. 5. The injection-port axial lines 159 point to different directions, and a part of the injection-port axial lines 159 are placed to cross the center axial line 18 of the sack chamber 154. When the fuel injector 10 is mounted to the gasoline engine, three injection-port axial lines 159a tilt relative to the exhaust valves 92 with respect to the center axial line 18 in the combustion chamber 90 as shown in FIG. 1. Therefore, the three injection-port axial lines 159a pass through a space between a top surface of the piston 94 and the exhaust valves 92 in the combustion chamber 90. According to the present embodiment, the space between a top surface of the piston 94 and the exhaust valves 92 in the combustion chamber 90 corresponds to an exhaust space. As shown in FIGS. 4 and 5, among the injection ports 155, three injection ports 155 limited by the three injection-port axial lines 159a correspond to exhaust injection ports 156.

Three injection-port axial lines 159b tilt relative to the intake valves 93 with respect to the center axial line 18 in the combustion chamber 90 as shown in FIG. 1. Therefore, the three injection-port axial lines 159b pass through a space between the top surface of the piston 94 and the intake valves 93 in the combustion chamber 90. According to the present embodiment, the space between the top surface of the piston 94 and the intake valves 93 in the combustion chamber 90 corresponds to an intake space. As shown in FIGS. 4 and 5, among the injection ports 155, three injection ports 155 limited by the three injection-port axial lines 159b corresponds to the intake injection ports 157.

Figure 6:
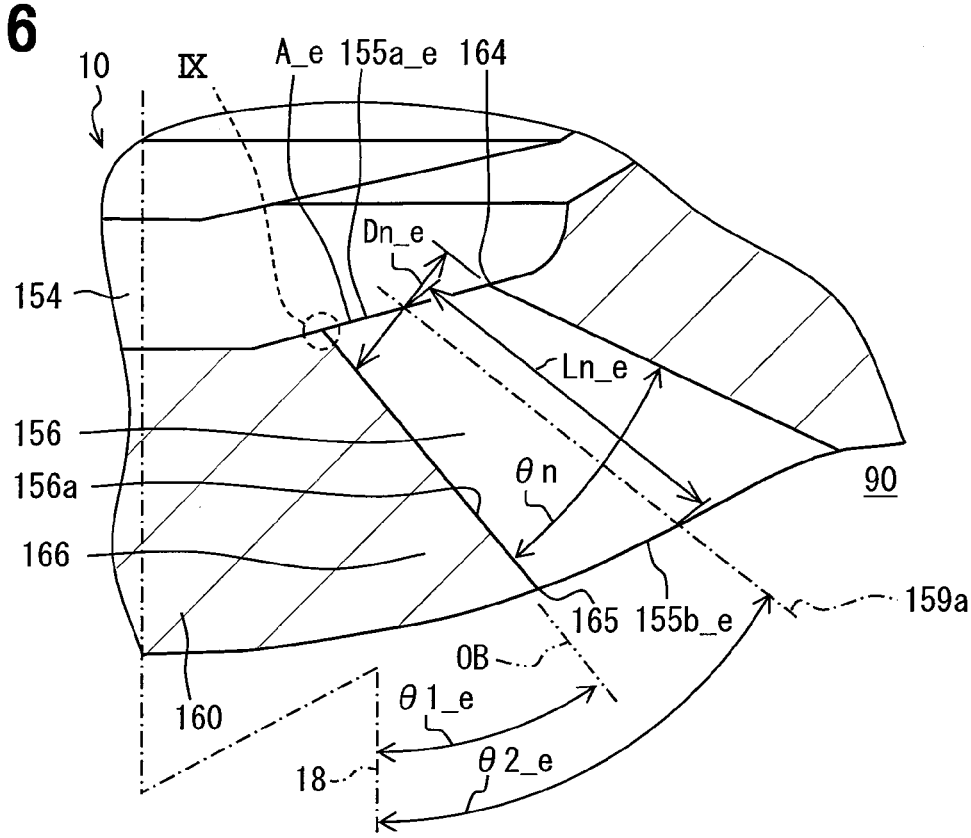
FIG. 6 is a sectional view showing an exhaust port.

As shown in FIG. 6, the exhaust injection ports 156 supply the fuel to the exhaust space. The exhaust injection ports 156 are injection ports having an enlarged tapered shape that a flow-passage area of each of the injection ports is enlarged from an inlet opening $155a\_e$ toward an outlet opening $155b\_e$. The inlet opening $155a\_e$ is exposed to the sack chamber 154, and the outlet opening $155b\_e$ is exposed to the combustion chamber 90. An inner peripheral wall surface 156a forming each of the exhaust injection ports 156 is a tapered surface and has an inner diameter enlarged from a reference diameter $Dn\_e$ toward the combustion chamber 90. According to the present embodiment, the reference diameter $Dn\_e$ is a reference value of a flow-passage inner diameter. The inner peripheral wall surface 156a is separated from the injection-port axial line 159a toward the outlet opening $155b\_e$. In a longitudinal section of each of the exhaust injection ports 156 which includes the injection-port axial line 159a, a tapered angle en of the inner peripheral wall surface 156a is in a range from 10 degrees to 30 degrees.

A flow-passage length $Ln\_e$ of each of the exhaust injection ports 156 divided by the reference diameter $Dn\_e$ is defined as an L/D value. The L/D value relates to atomization characteristics of a spray of the fuel injector 10 and a contraction rate of the spray. Next, referring to FIGS. 6, 8A, and 8B, a setting range of the L/D value of each of the exhaust injection ports 156 will be described. The contraction rate of the spray of each of the exhaust injection ports 156 is an angle $\theta 2\_e$ divided by an angle $\theta 1\_e$ in the longitudinal section including the injection-port axial line 159a. The angle $\theta 1\_e$ is an angle from the center axial line 18 to an outer boundary OB of the spray, and the angle $\theta 2\_e$ is an angle from the center axial line 18 to the injection-port axial line 159a.

Figure 8A:
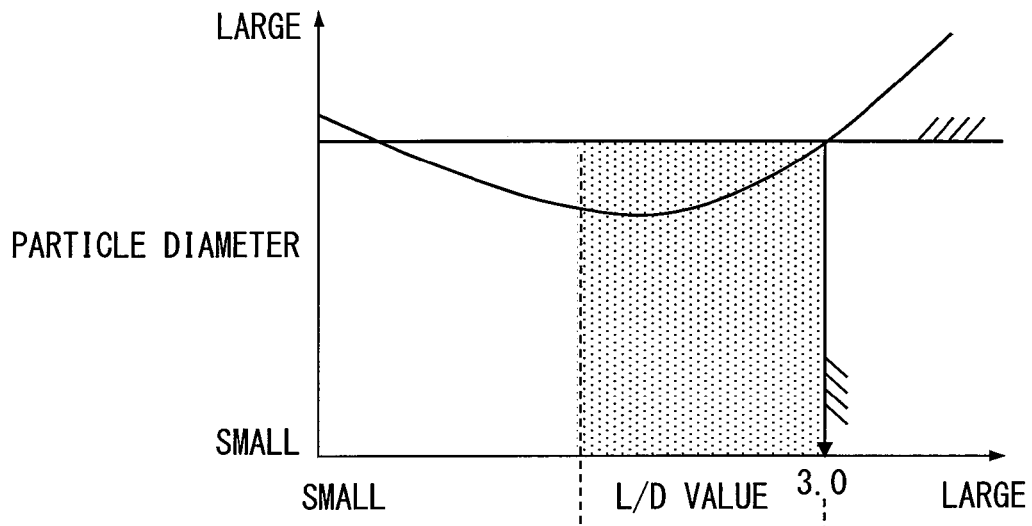
FIG. 8A is a graph showing a relationship between a L/D value of an injection port having an enlarged tapered shape and a particle diameter of a spray.

As shown in FIG. 8A, the atomization characteristics of the spray becomes optimal according to a specified L/D value that a particle diameter of the spray becomes minimum. The L/D value of each of the exhaust injection ports 156 is limited in a range that the particle diameter of the spray is no more than a predetermined maximum particle diameter according to a request of the gasoline engine. According to the present embodiment, since each of the exhaust injection ports 156 has an enlarged tapered shape, an upper limit of the L/D value is 3.0.

Figure 8B:
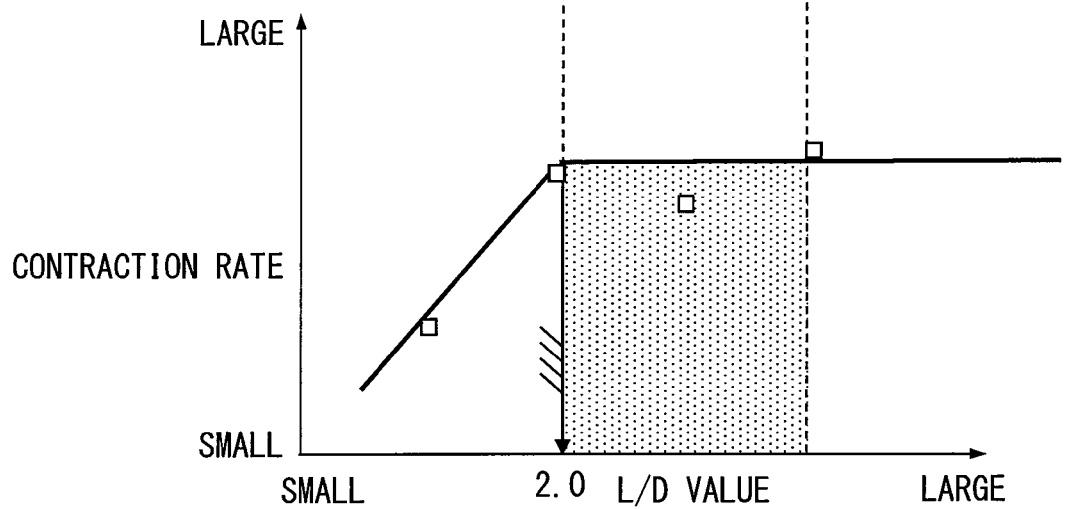
FIG. 8B is a graph showing a relationship between the L/D value and a contraction rate of the spray.
Figure 9:
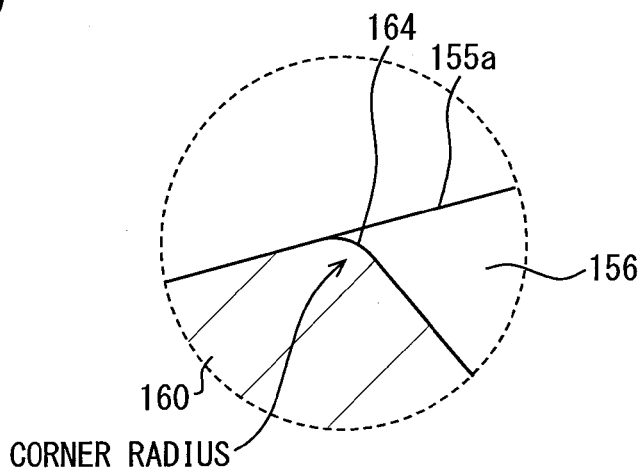
FIG. 9 is a sectional view of an area IX of FIG. 6.

When a flow passage of an injection port becomes longer, a flowing direction of the fuel flowing through the injection port is regulated. Therefore, the spray is readily injected along the axial line. As shown in FIG. 8B, the contraction rate of the spray increases in accordance with an increase in L/D value. When the L/D value exceeds a specified value, the contraction rate of the spray is substantially fixed. In this case, the specified value is referred to as a saturation value. The L/D value of each of the exhaust injection ports 156 is limited to a value that the L/D value is greater than or equal to the saturation value. According to the present embodiment, since each of the exhaust injection ports 156 has an enlarged tapered shape, the saturation value is 2.0.

As the above description, the L/D value of each of the exhaust injection ports 156 is in a range from 2.0 to 3.0.

Figure 7:
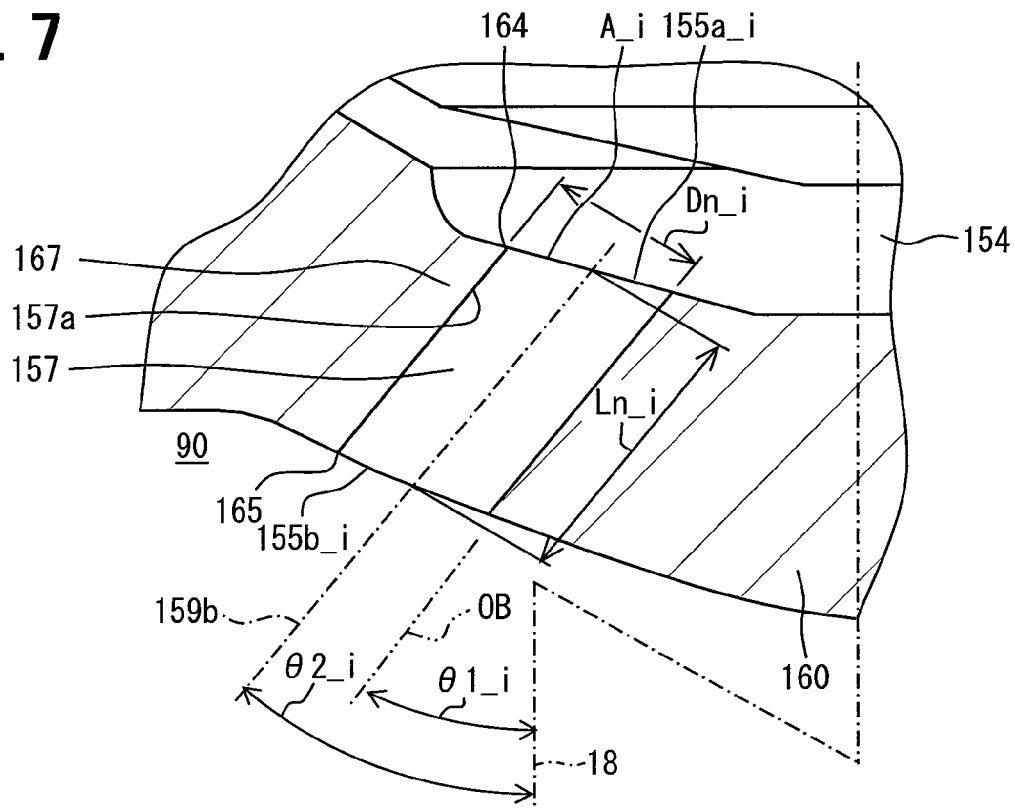
FIG. 7 is a sectional view showing an intake port.

As shown in FIG. 7, the intake injection ports 157 supply the fuel to the intake space. The intake injection ports 157 are injection ports having a straight shape that a flow-passage area of each of the injection ports is fixed from an inlet opening $155a\_i$ toward an outlet opening $155b\_i$. The inlet opening $155a\_i$ is exposed to the sack chamber 154, and the outlet opening $155b\_i$ is exposed to the combustion chamber 90. An inner peripheral wall surface 157a forming each of the intake injection ports 157 is cylindrical shaped and has an inner diameter equal to a reference diameter $Dn\_i$. The inner peripheral wall surface 157a extends along the injection-port axial line 159b.

A flow-passage length $Ln\_i$ of each of the intake injection ports 157 divided by the reference diameter $Dn\_i$ is defined as an L/D value. According to the present embodiment, the L/D value of each of the intake injection ports 157 is greater than or equal to 1.5. In this case, 1.5 is a lower limit of the L/D value corresponding to a saturation value of the contraction rate of the spray in a straight-shaped injection port. The contraction rate of the spray of each of the intake injection ports 157 is an angle $\theta 2\_i$ divided by an angle $\theta 1\_i$ in the longitudinal section including the injection-port axial line 159b. The angle $\theta 1\_i$ is an angle from the center axial line 18 to an outer boundary OB of the spray, and the angle $\theta 2\_i$ is an angle from the center axial line 18 to the injection-port axial line 159b.

As shown in FIGS. 7, 8A, and 8B, the reference diameter $Dn\_i$ of each of the intake injection ports 157 is substantially equal to the reference diameter Dn_e of each of the exhaust injection ports 156. Therefore, an area A_i of the inlet opening 155a_i of each of the intake injection ports 157 is equal to an area A_e of the inlet opening 155a_e of each of the exhaust injection ports 156. According to the present embodiment, the area A_i and the area A_e are substantially equal to each other. As shown in FIG. 5, inlet openings 155a_i of the intake injection ports 157 and inlet openings 155a_e of the exhaust injection ports 156 are arranged with the same interval along the imaginary circle 19. According to the present embodiment, centers of the inlet openings 155a_i and 155a_e are on the imaginary circle 19, and the imaginary circle 19 is around the center axial line 18.

The bottom wall 160 further includes a first area 167 and a second area 166. The first area 167 is a part of the bottom wall 160 which is penetrated by the intake injection ports 157, and the second area 166 is a part of the bottom wall 160 which is penetrated by the exhaust injection ports 156. When the L/D values of the intake injection ports 157 and the L/D values of the exhaust injection ports 156 are different, the flow-passage lengths Ln_i and Ln_e are different. Therefore, a wall thickness of the first area 167 is established according to the flow-passage length Ln_i of each of the intake injection ports 157 and a wall thickness of the second area 166 is established according to the flow-passage length Ln_e of each of the exhaust injection ports 156, so as to correct a difference between the flow-passage lengths Ln_i and Ln_e. Specifically, the wall thickness of the first area 167 along the injection-port axial line 159b is less than the wall thickness of the second area 166 along the injection-port axial line 159a.

The exhaust injection ports 156 and the intake injection ports 157 are drilled into the bottom wall 160 by a laser processing. In this case, a corner radius of each of edges 164 forming the inlet openings 155a_i and 155a_e becomes magnificently small in the longitudinal section including the injection-port axial line 159b or 159a in each of the intake injection ports 157 or each of the exhaust injection ports 156. Further, a corner radius of each of edges 165 forming the outlet openings 155b_i and 155b_e becomes magnificently small. Specifically, the corner radius of each of the edges 164 and 165 is less than or equal to 10 micrometers.

According to the present embodiment, since each of the intake injection ports 157 has a straight shape to point to the intake space in the combustion chamber 90, the spray injected from the intake injection ports 157 has a high penetration. Since the penetration of the spray injected by each of the intake injection ports 157 is increased, it is possible that the fuel enters and is completely mixed with the whole air flowing at a high flow rate in the intake space of the combustion chamber 90.

Since each of the exhaust injection ports 156 has an enlarged tapered shape, the penetration of the spray injected by the exhaust injection ports 156 is less than the penetration of the spray injected by the intake injection ports 157. Therefore, the spray injected by the exhaust injection ports 156 is mixed with the whole air flowing at a flow rate less than the high flow rate without going through the air in the exhaust space of the combustion chamber 90.

As the above description, the penetration of the spray is adjusted by a shape of each of the intake injection ports 157 and a shape of each of the exhaust injection ports 156. Therefore, a quantity of the fuel flowing through each of the intake injection ports 157 and a quantity of the fuel flowing through each of the exhaust injection ports 156 can be properly adjusted in a design stage, and both flow rates can be the same. Thus, in each of the injection ports 155, the fuel can be optimally injected in the pointing direction.

According to the present embodiment, the fuel injector 10 can properly inject the quantity of the fuel to every position of the combustion chamber 90 in a state that the fuel and the air are readily mixed with each other. Therefore, a homogeneity of a mixed gas of the fuel and the air in the combustion chamber 90 can be improved.

According to the present embodiment, the L/D value of each of the exhaust injection ports 156 is optimized. Therefore, the spray injected by the exhaust injection ports 156 is atomized and is spread in the combustion chamber 90, and is further readily mixed with the air in the exhaust space of the combustion chamber 90. Further, since the L/D value of each of the intake injection ports 157 is optimized, the spray injected by the intake injection ports 157 is prevented from being contracted. Therefore, the spray of the intake injection ports 157 further readily enters and is further readily mixed with the whole air in the intake space of the combustion chamber 90.

According to the present embodiment, since the wall thickness of the first area 167 and the wall thickness of the second area 166 are set to be different, a difference between the flow-passage length Ln_i and the flow-passage length Ln_e is canceled. In a case where the flow-passage length Ln_i optimally established in each of the intake injection ports 157 is different from the flow-passage length Ln_e optimally established in each of the exhaust injection ports 156, since the wall thickness of the first area 167 and the wall thickness of the second area 166 are established to be different to each other, corrections of the flow-passage lengths Ln_i and Ln_e can be achieved.

According to the present embodiment, the area A_i of the inlet opening 155a_i are substantially equal to the area A_e of the inlet opening 155a_e. Therefore, the quantity of the fuel flowing through the intake injection ports 157 and the quantity of the fuel flowing through the exhaust injection ports 156 are substantially the same. Thus, quantities of the fuel injected in different directions are substantially equal to each other. Then, the homogeneity of the mixed gas of the fuel and the air in every position of the combustion chamber 90 can be improved.

According to the present embodiment, since the inlet openings 155a are arranged with the same interval, the fuel in the sack chamber 154 can equally flow into the inlet openings 155a. Therefore, the quantities of the fuel injected by the injection ports 155 are further uniformized. Thus, the homogeneity of the mixed gas of the fuel and the air in every position of the combustion chamber 90 can be further improved.

Figure 10:
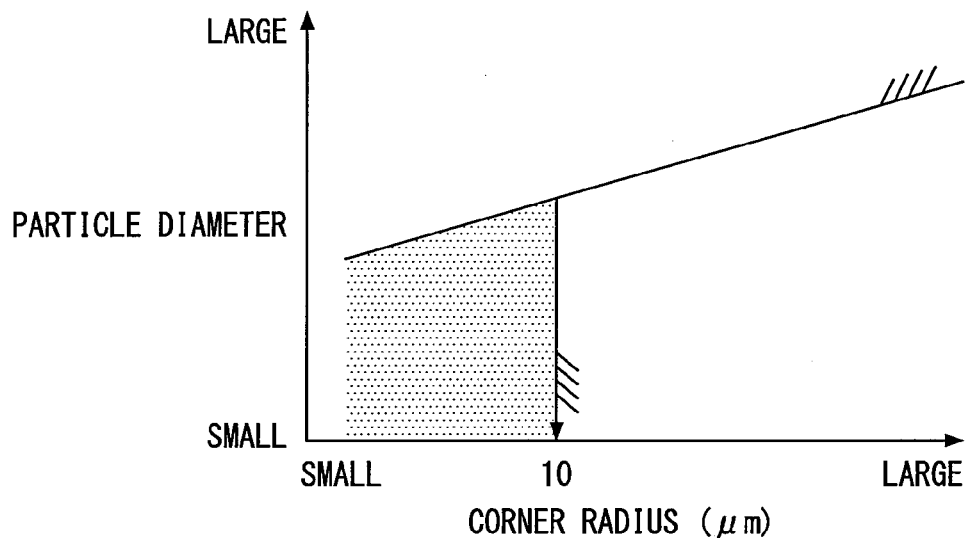
FIG. 10 is a graph showing a relationship between a corner radius of an edge portion forming an inlet opening of the injection port and the particle diameter.

According to the present embodiment, the corner radius of each of the edges 164 is less than or equal to 10 micrometers. As shown in FIG. 10, the particle diameter of the spray decreases in accordance with a decrease in corner radius of each of the edges 164. Since the corner radius of each of the edges 164 becomes magnificently small by a laser processing, the spray of the fuel injected by the injection ports 155 is further readily mixed with the air.

According to the present embodiment, the bottom wall 160 corresponds to an injection-port wall.

Second Embodiment

Figure 11:
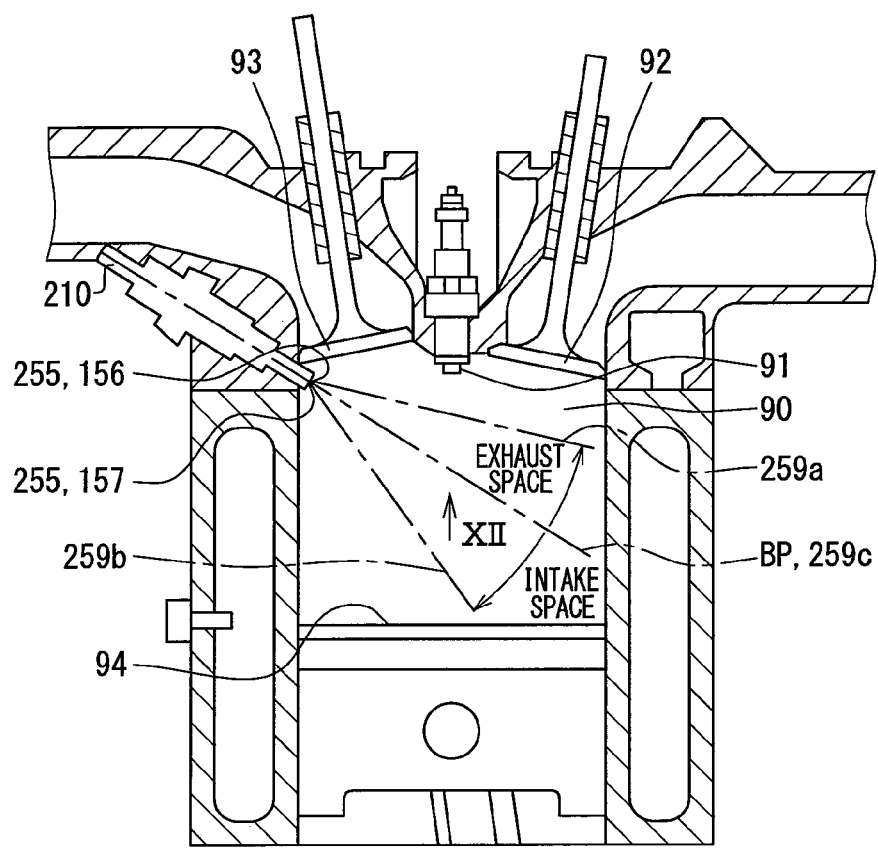
FIG. 11 is a diagram showing the fuel injector mounted to the gasoline engine to execute the center injection, according to a second embodiment of the present disclosure.
Figure 12:
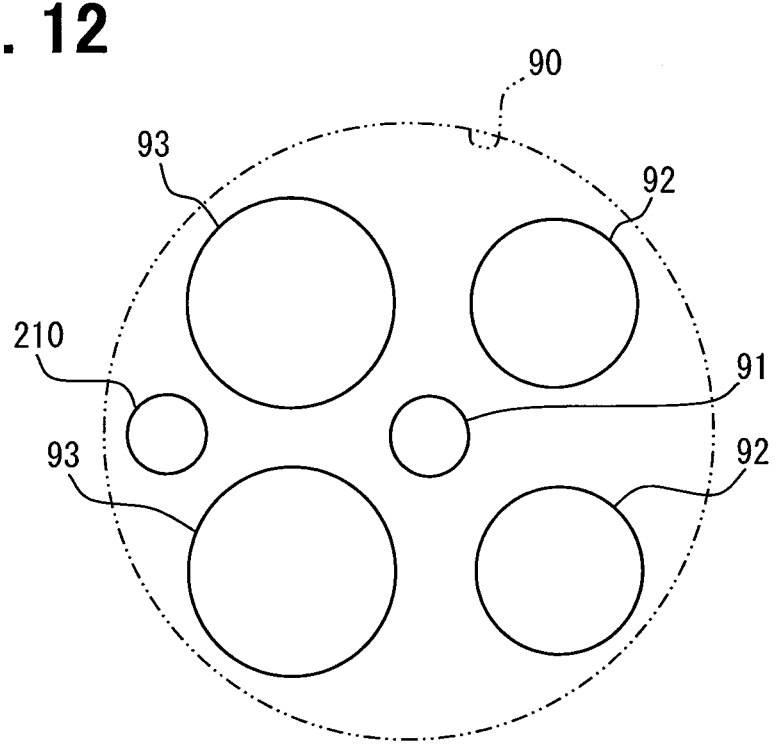
FIG. 12 is a block diagram viewed from an arrow XII of FIG. 11 and showing a relationship between the fuel injector and other members around the fuel injector according to the second embodiment.
Figure 13:
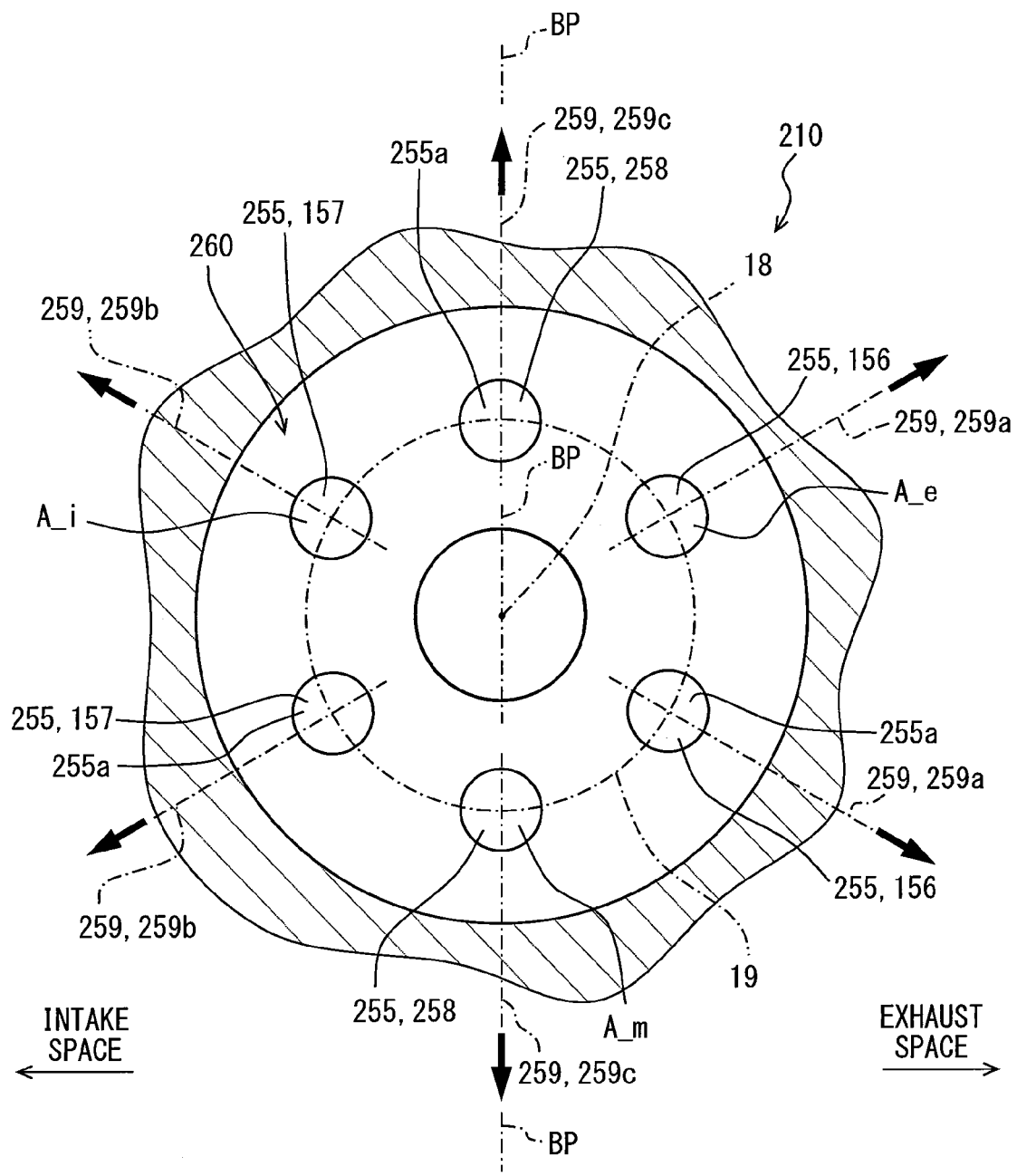
FIG. 13 is a diagram showing an arrangement and a pointing direction of each injection port.

A second embodiment of the present disclosure as shown in FIGS. 11 to 13 is a modification example of the first embodiment. According to the second embodiment, a fuel injector 210 is mounted to the combustion chamber 90 in a different manner from the first embodiment. As shown in FIGS. 11 and 12, the fuel injector 210 is placed at a position that the ignition plug 91 is interposed between the fuel injector 210 and the exhaust valves 92. The fuel injector 210 includes an end part forming plural injection ports 255. The fuel injector 210 is placed at a position between the intake valves 93. Further, the fuel injector 210 is placed at a position around the combustion chamber 90 to tilt relative to the ignition plug 91, and injects the fuel from a side wall of the combustion chamber 90 toward the combustion chamber 90.

As shown in FIG. 13, a bottom wall 260 is provided with six injection ports 255 which have injection-port axial lines 259 in pointing directions different from each other. The injection ports 255 include the exhaust injection ports 156, the intake injection ports 157, and intermediate injection ports 258. According to the present embodiment, two exhaust injection ports 156, two intake injection ports 157, and two intermediate injection ports 258 are included in the injection ports 255. Inlet openings 255a of the exhaust injection ports 156, the intake injection ports 157, and the intermediate injection ports 258 are arranged with the same interval along the imaginary circle 19 around the center axial line 18. Further, areas A_e, A_i, A_m of the inlet openings 255a are substantially equal to each other.

An imaginary surface including the injection-port axial lines 259c of the intermediate injection ports 258 and the center axial line 18 is referred to as a boundary plane BP. The boundary plane BP divides the intake space and the exhaust space in the combustion chamber 90, that is, the boundary plane BP is a boundary of the intake space and the exhaust space in the combustion chamber 90. According to the present embodiment, the intake space is adjacent to the piston 94, and the exhaust space is adjacent to the exhaust valves 92. When the fuel injector 210 is mounted to the gasoline engine, the boundary plane BP tilts relative to the combustion chamber 90 as shown in FIG. 11.

As shown in FIGS. 11 and 13, the injection-port axial lines 259a of the exhaust injection ports 156 point to the exhaust space. Therefore, the exhaust injection ports 156 point to the exhaust space in the combustion chamber 90. The exhaust injection ports 156 inject the spray of which the penetration is reduced toward the exhaust space in the combustion chamber 90.

The injection-port axial lines 259b of the intake injection ports 157 point to the intake space. Therefore, the intake injection ports 157 point to the intake space in the combustion chamber 90. The intake injection ports 157 inject the spray of which the penetration is ensured toward a top surface of the piston 94 and supply the fuel to the intake space in the combustion chamber 90.

As shown in FIG. 13, the injection-port axial lines 259c of the intermediate injection ports 258 overlap the boundary plane BP. The intermediate injection ports 258 are injection ports having a straight shape that a flow-passage area of each of the intermediate injection ports 258 is substantially fixed. The intermediate injection ports 258 inject the spray of which the penetration is ensured along the boundary plane BP and supply the fuel to the combustion chamber 90.

According to the second embodiment, since each of the intake injection ports 157 and each of the exhaust injection ports 156 have different shapes, the penetration of the spray injected by each of the intake injection ports 157 and the penetration of the spray injected by each of the exhaust injection ports 156 are adjusted. Therefore, the fuel injector 210 can properly inject the quantity of the fuel to every position of the combustion chamber 90 in a state that the fuel and the air are readily mixed with each other. Therefore, the homogeneity of the mixed gas of the fuel and the air in the combustion chamber 90 can be improved.

In addition, the bottom wall 260 corresponds to the injection-port wall.

Other Embodiment

The present disclosure is not limited to the embodiments mentioned above, and can be applied to various embodiments within the spirit and scope of the present disclosure.

According to the first embodiment, the fuel injector 10 is interposed between the ignition plug 91 and the intake valves 93 and injects the fuel from a center of a ceiling surface of the combustion chamber 90. However, a position relationship between a center-injection fuel injector corresponding to the fuel injector 10, the ignition plug 91, the exhaust valves 92, and the intake valves 93 may be changed as followings.

Figure 14:
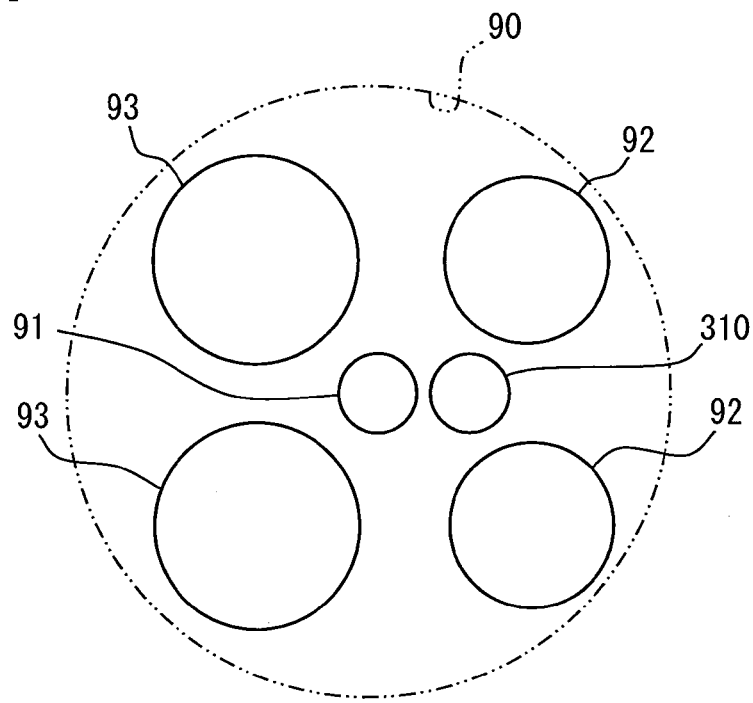
FIG. 14 is a first modification example of FIG. 2.
Figure 15:
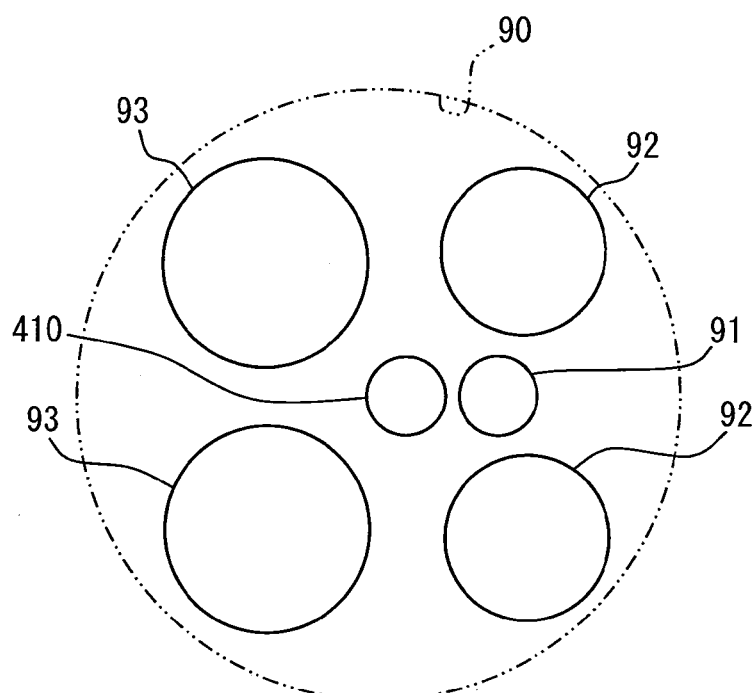
FIG. 15 is a second modification example of FIG. 2.

In a first modification example as shown in FIG. 14, the ignition plug 91 is disposed at a position that is a center of an area formed by the intake valves 93 and the exhaust valves 92. According the first modification example, a fuel injector 310 is interposed between the ignition plug 91 and the exhaust valves 92, that is, the fuel injector 310 is shifted from the ignition plug 91. In a second modification example as shown in FIG. 15, a fuel injector 410 is disposed at a position that is the center of the area formed by the intake valves 93 and the exhaust valves 92. The ignition plug 91 is interposed between the fuel injector 410 and the exhaust valves 92, that is, the ignition plug 91 is shifted from the fuel injector 410.

Figure 16:
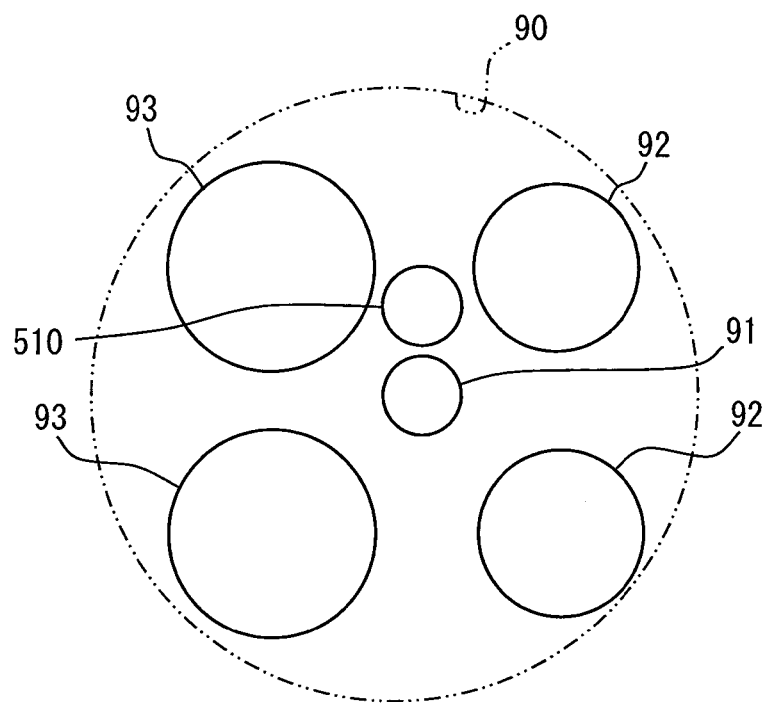
FIG. 16 is a third modification example of FIG. 2.
Figure 17:
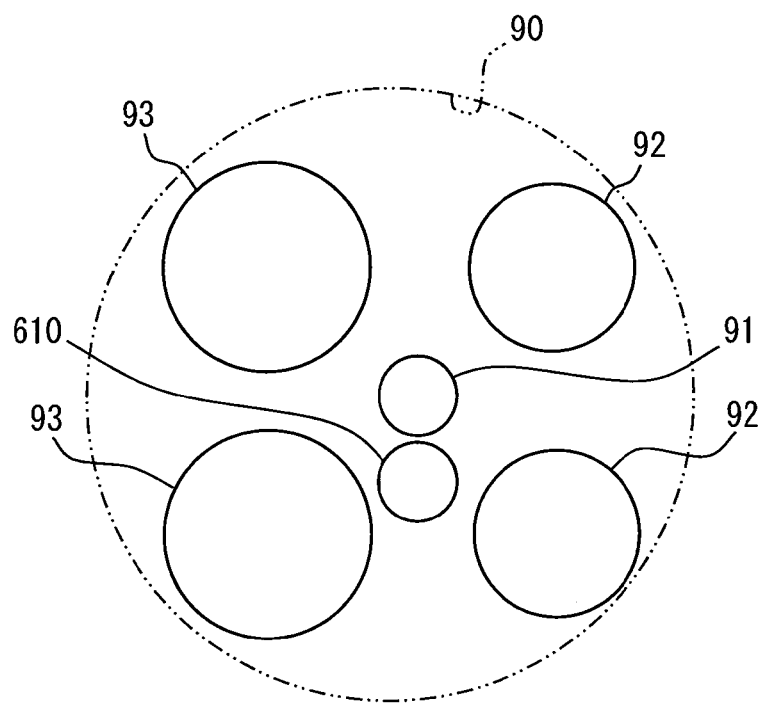
FIG. 17 is a fourth modification example of FIG. 2.

In a third modification example as shown in FIG. 16 and a fourth modification example as shown in FIG. 17, a fuel injector 510 and the ignition plug 91 are arranged in a direction parallel to an axial direction of a crank shaft (not shown) of the gasoline engine, and a fuel injector 610 and the ignition plug 91 are arranged in a direction parallel to the axial direction of the crank shaft. Further, an arrangement direction of the intake valves 93 and an arrangement direction of the exhaust valves 92 are parallel to the axial direction of the crank shaft. According to the third modification example and the fourth modification example, the ignition plug 91 is disposed at a position that is the center of the area formed by the intake valves 93 and the exhaust valves 92. Therefore, the fuel injector 510 and the fuel injector 610 are shifted in the direction parallel to the axial direction of the crank shaft.

Figure 18:
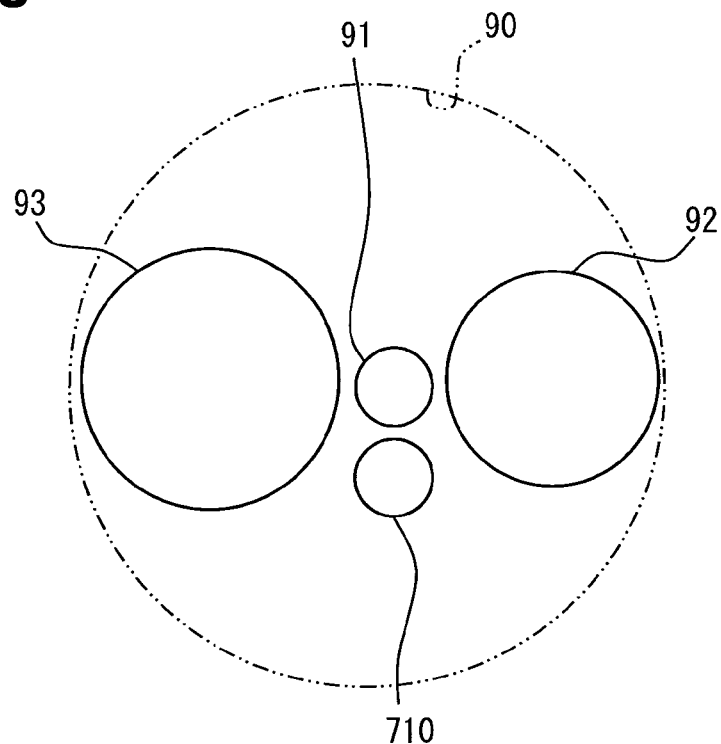
FIG. 18 is a fifth modification example of FIG. 2.
Figure 19:
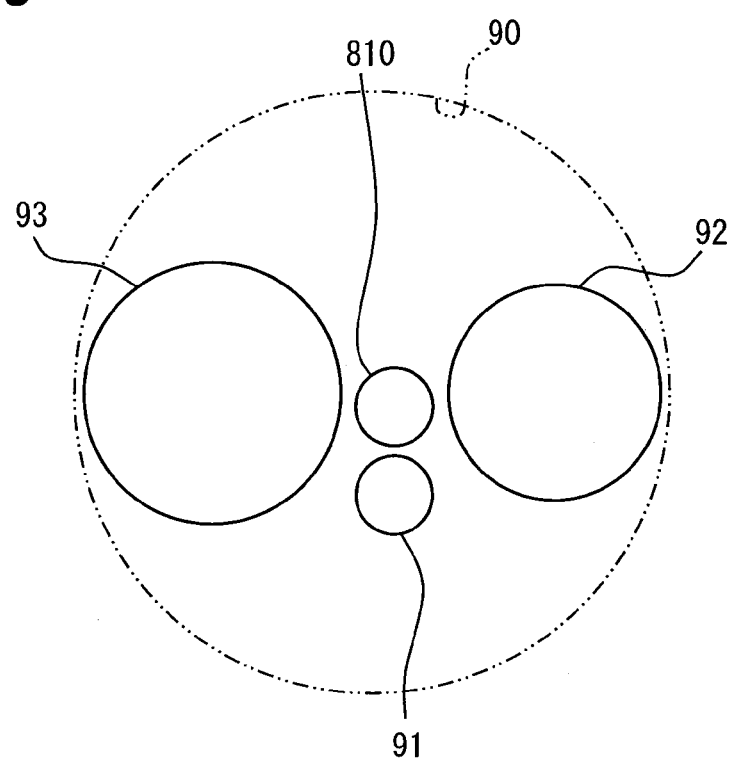
FIG. 19 is a sixth modification example of FIG. 2.

In a fifth modification example as shown in FIG. 18 and a sixth modification example as shown in FIG. 19, one intake valve 93 and one exhaust valve 92 are mounted to the combustion chamber 90. In this case, the present disclosure is also applied to a fuel injector mounted to the combustion chamber 90. Specifically, in the fifth modification example as shown in FIG. 18, the ignition plug 91 is interposed between the intake valve 93 and the exhaust valve 92. Further, the ignition plug 91 is disposed at a position that is a center of the intake valve 93 and the exhaust valve 92. A fuel injector 710 is disposed at a position that the fuel injector 710 and the ignition plug 91 are arranged in a direction parallel to the axial direction of the crank shaft, and the fuel injector 710 is shifted from the ignition plug 91. In the sixth modification example as shown in FIG. 19, a fuel injector 810 is interposed between the intake valve 93 and the exhaust valve 92. Further, the fuel injector 810 is disposed at a position that is the center of the intake valve 93 and the exhaust valve 92. The ignition plug 91 is disposed at a position that the ignition plug 91 and the fuel injector 810 are arranged in a direction parallel to the axial direction of the crank shaft, and the ignition plug 91 is shifted from the fuel injector 810.

In another modification example, a center of one intake valve and a center of one exhaust valve are arranged in a direction parallel to the axial direction of the crank shaft, and are shifted from each other. In this case, the ignition plug is disposed in a space generated by shifting the exhaust valve. Further, the fuel injector is disposed in a space generated by shifting the intake valve.

According to the second embodiment, each of the intermediate injection ports also has a straight shape as the same as the intake injection ports. However, each of the intermediate injection ports may have an enlarged tapered shape as the same as the exhaust injection ports. In this case, a tapered angle and a L/D value of each of the intermediate injection ports may be the same as those of each of the exhaust injection ports or not.

According to the above embodiments, plural intake injection ports substantially have the same shape. Further, plural exhaust injection ports substantially have the same shape. However, the intake injection ports may have different shapes, and the exhaust injection ports may have different shapes. Specifically, the intake injection ports may have an injection port having a tapered shape, or an injection port having a straight shape. In this case, an L/D value of the injection port having a straight shape is less than 1.5. Further, the exhaust injection ports may have an injection port having a straight shape, or an injection port having an enlarged tapered shape. In this case, an L/D value of the injection port having an enlarged tapered shape is out of the range from 2.0 to 3.0. Furthermore, a cross section of each of the intake injection ports and each of the exhaust injection ports which cross a corresponding injection-port axial line of each of the intake injection ports and each of the exhaust injection ports is not limited to a circular shape. For example, the cross section may be an elliptical shape, a rectangular shape, or a polygonal shape.

According to the above embodiments, differences between flow-passage lengths of the intake injection ports and the exhaust injection ports are adjusted by changing the wall thickness of the bottom wall in every area. The above differences between the wall thicknesses of the bottom wall may be provided in a case where the nozzle body is formed, or may be provided by cutting an end portion of the nozzle body after the nozzle body is formed. Further, when a crossing angle between an inner surface of the injection port having the tapered shape and the injection-port axial line becomes small, that is, when the injection port further tilts relative to the center axial line, the flow-passage length of the injection port becomes longer.

According to the above embodiments, areas of all of the inlet openings are substantially the same. However, the areas may be slightly different from each other. Further, centers of the inlet openings may be slightly shifted from the imaginary circle in a radial direction of the imaginary circle, that is, the centers of the inlet openings may be not on the imaginary circle. Furthermore, intervals between the inlet openings may be not fixed. In addition, the inlet openings may be properly shifted from the imaginary circle in a peripheral direction of the imaginary circle according to a flow of the fuel in the sack chamber.

According to the above embodiments, a corner radius of each of the edges is miniaturized by using a laser processing. However, it is not limited to the laser processing to drill the bottom wall. Each of the injection ports may be formed by machining such as an electric discharge machining or a combination of the above methods.

According to the above embodiments, the present disclosure is applied to the fuel injector injecting gasoline into the combustion chamber as the fuel. However, the present disclosure may be applied to a fuel injector using other fuel such as a gas fuel or a light oil.

While the present disclosure has been described with reference to the embodiments thereof, it is to be understood that the disclosure is not limited to the embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A fuel injector injecting a fuel toward a combustion chamber mounted to an internal combustion engine, the fuel injector comprising:
    a plurality of injection ports through which the fuel is injected, wherein
    each injection port includes an injection-port axial line limiting a pointing direction of the injection port,
    injection-port axial lines point to different directions,
    the injection ports include at least one intake injection port the injection-port axial line of which points to an intake space in the combustion chamber between a top surface of a piston of the internal combustion engine and an intake valve of the internal combustion engine,
    the intake injection port is defined by an inner peripheral wall surface extending in the injection-port axial line of the intake injection port and having a straight shape,
    the injection ports further include at least one exhaust injection port the injection-port axial line of which points to an exhaust space in the combustion chamber between the top surface of the piston of the internal combustion engine and an exhaust valve of the internal combustion engine, and
    the exhaust injection port is defined by an inner peripheral wall surface separated from the injection-port axial line of the exhaust injection port toward an outlet opening and having an enlarged shape toward the outlet opening.

2. The fuel injector according to claim 1, wherein
    the inner peripheral wall surface of the exhaust injection port is an enlarged tapered shape and has a flow-passage area enlarged from a reference diameter toward the outlet opening of the exhaust injection port, and
    a value defined by a flow-passage length of the exhaust injection port divided by the reference diameter is in a range from 2.0 to 3.0.

3. The fuel injector according to claim 1, wherein
    the inner peripheral wall surface of the intake injection port is a straight shape that a flow-passage area of the intake injection port is fixed to a reference diameter,
    a value defined by a flow-passage length of the intake injection port divided by the reference diameter is no less than 1.5.

4. The fuel injector according to claim 1, further comprising:
    an injection-port wall defining a first area through which the intake injection port is penetrated and a second area through which the exhaust injection port is penetrated, wherein
    the first area has a thickness is established according to the flow-passage length of the intake injection port, the second area has a thickness is established according to the flow-passage length of the exhaust injection port, and the thickness of the first area and the thickness of the second area are different from each other.

5. The fuel injector according to claim 1, wherein an area of an inlet opening of the intake injection port is equal to an area of an inlet opening of the exhaust injection port.

6. The fuel injector according to claim 1, further comprising:

a sack portion including a recession portion that is a cylindrical-shaped hole, the recession portion defining a sack chamber communicating with the injection ports, wherein each of the injection ports includes an inlet opening opened at the sack chamber, and the inlet openings are arranged with the same interval around a center axial line of the sack chamber.

7. The fuel injector according to claim 1, wherein a corner radius of each of edges defining the inlet openings in a longitudinal section including the injection-port axial line in each of the intake injection ports or each of the exhaust injection ports is no more than 10 micrometers.

* * * * *